United States Patent
He et al.

(10) Patent No.: US 11,906,217 B2
(45) Date of Patent: Feb. 20, 2024

(54) ELECTRONIC EXPANSION VALVE

(71) Applicant: Zhejiang Sanhua Intelligent Controls Co., Ltd., Shaoxing (CN)

(72) Inventors: Weixin He, Zhejiang (CN); Qing Chang, Zhejiang (CN); Ze Yuan, Zhejiang (CN); Zicheng Shen, Zhejiang (CN)

(73) Assignee: Zhejiang Sanhua Intelligent Controls Co., Ltd., Shaoxing (CN)

( * ) Notice: Subject to any disclaimer, the term of this patent is extended or adjusted under 35 U.S.C. 154(b) by 351 days.

(21) Appl. No.: 17/287,845

(22) PCT Filed: Oct. 25, 2019

(86) PCT No.: PCT/CN2019/113233
§ 371 (c)(1),
(2) Date: Apr. 22, 2021

(87) PCT Pub. No.: WO2020/083362
PCT Pub. Date: Apr. 30, 2020

(65) Prior Publication Data
US 2021/0396435 A1 Dec. 23, 2021

(30) Foreign Application Priority Data

Oct. 27, 2018 (CN) .......................... 201811262155.7
Jan. 16, 2019 (CN) .......................... 201910041251.7

(51) Int. Cl.
*F25B 41/35* (2021.01)
(52) U.S. Cl.
CPC .......... *F25B 41/35* (2021.01); *F25B 2500/12* (2013.01)
(58) Field of Classification Search
CPC ...... F25B 41/34; F25B 41/35; F25B 2500/12; F16K 31/06; Y02B 30/70
See application file for complete search history.

(56) References Cited

U.S. PATENT DOCUMENTS

| 4,362,027 A | 12/1982 | Barbier |
| 2015/0114495 A1 | 4/2015 | Zhan et al. |

FOREIGN PATENT DOCUMENTS

| CN | 2797792 Y | 7/2006 |
| CN | 101466986 A | 6/2009 |

(Continued)

OTHER PUBLICATIONS

PCT/CN2019/113233, Feb. 6, 2020, International Search Report and Written Opinion.

(Continued)

*Primary Examiner* — Kun Kai Ma
(74) *Attorney, Agent, or Firm* — Wolf, Greenfield & Sacks, P.C.

(57) ABSTRACT

An electronic expansion valve includes a valve seat assembly, a first pipe connecting portion, and a second pipe connecting portion. The valve seat assembly includes an outer wall portion, a valve port portion having a valve port, a first valve seat cavity, and a second valve seat cavity. The first valve seat cavity is located above the valve port portion. The second valve seat cavity is located below the valve port portion. The valve port is capable of communicating with the first valve seat cavity and the second valve seat cavity. The first pipe connecting portion is fixedly connected to the outer wall portion located above the valve port portion. The second pipe connecting portion is fixedly connected to the outer wall portion located below the valve port portion. The inner diameter of the second valve seat cavity is greater than the inner diameter of the second pipe connecting portion.

19 Claims, 6 Drawing Sheets

(56) References Cited

FOREIGN PATENT DOCUMENTS

| | | | |
|---|---|---|---|
| CN | 201747954 U | | 2/2011 |
| CN | 103115190 A | * | 5/2013 |
| CN | 104806774 A | | 7/2015 |
| CN | 105333203 A | | 2/2016 |
| CN | 106151552 A | | 11/2016 |
| CN | 205715985 U | | 11/2016 |
| CN | 207584047 U | | 7/2018 |
| CN | 108361385 A | | 8/2018 |
| CN | 207880164 U | | 9/2018 |
| EP | 0275931 A2 | * | 7/1988 |
| EP | 2 725 269 A1 | | 4/2014 |
| EP | 2 821 682 A4 | | 1/2015 |
| EP | 2 980 510 A1 | | 2/2016 |
| EP | 3 171 058 A1 | | 5/2017 |
| JP | H09-310939 A | | 12/1997 |
| JP | H11-325658 A | | 11/1999 |
| JP | 2002-323273 A | | 11/2002 |
| JP | 2008-095892 A | | 4/2008 |
| JP | 2009-024937 A | | 2/2009 |
| JP | 2010-249246 A | | 11/2010 |
| JP | 2013-217408 A | | 10/2013 |
| WO | WO 2014/155518 A1 | | 10/2014 |

OTHER PUBLICATIONS

JP2021-518600, Mar. 22, 2022, Office Action.
International Search Report and Written Opinion for International Application No. PCT/CN2019/113233, dated Feb. 6, 2020.
Second Office Action for Chinese Application No. 201910041251.7, dated Jun. 29, 2022.
Extended European Search Report for European Application No. 19876841.8, dated Sep. 8, 2022.
Third Party Observations on Patentability for European Application No. 19876841.8, dated Dec. 14, 2021.
First Office Action for Chinese Application No. 201810041251.7, dated Jan. 4, 2022.
Office Action for Japanese Application No. 2021-518600, dated Mar. 22, 2022.
EP19876841.8, Dec. 14, 2021, Third Party Observations on Patentability.
CN201810041251.7, Jan. 4, 2022, First Office Action.
CN201910041251.7, Jun. 29, 2022, Second Office Action.
EP19876841.8, Sep. 8, 2022, Extended European Search Report.

* cited by examiner

ELECTRONIC EXPANSION VALVE

This application is a national stage filing under 35 U.S.C. § 371 of International Patent Application No. PCT/CN2019/113233, titled "ELECTRONIC EXPANSION VALVE", filed on Oct. 25, 2019, which claims the benefits of priorities to the following two Chinese patent applications. The contents of these applications are incorporated herein by reference in their entirety.

1) Chinese Patent Application No. 201811262155.7, titled "ELECTRONIC EXPANSION VALVE", filed with the China National Intellectual Property Administration on Oct. 27, 2018; and
2) Chinese Patent Application No. 201910041251.7, titled "ELECTRONIC EXPANSION VALVE", filed with the China National Intellectual Property Administration on Jan. 16, 2019.

FIELD

The present application relates to the technical field of refrigeration control, and particularly to an electronic expansion valve.

BACKGROUND

A refrigeration system usually includes a compressor, a throttling member, an outdoor heat exchanger and other components. The throttling member may adopt an electronic expansion valve to regulate refrigerant flow. When the refrigerant passes through the electronic expansion valve, some noise may be generated. Therefore, the structure of the electronic expansion valve may be optimized to reduce the noise generated when the refrigerant passes through the electronic expansion valve.

SUMMARY

An object of the present application is to provide an electronic expansion valve to reduce the noise generated when the refrigerant passes through the electronic expansion valve.

For the above object, the following technical solution is provided in the present application.

The electronic expansion valve includes a valve seat assembly, a first pipe connecting portion and a second pipe connecting portion. The valve seat assembly includes an outer wall portion and a valve port portion provided with a valve port. The electronic expansion valve includes a first valve seat chamber and a second valve seat chamber. The first valve seat chamber is located above the valve port portion, and the second valve seat chamber is located below the valve port portion. The valve port portion can communicate the first valve seat chamber and the second valve seat chamber. The first pipe connecting portion is fixedly connected to an outer wall portion located above the valve port portion, and the second pipe connecting portion is fixedly connected to an outer wall portion located below the valve port portion. An inner diameter of the second valve seat chamber is greater than an inner diameter of the second pipe connecting portion, and the inner diameter of the valve port portion is less than the inner diameter of the second valve seat chamber.

The electronic expansion valve according to the present application includes the first valve seat chamber and the second valve seat chamber. When the refrigerant passes through the electronic expansion valve in one flow direction, the refrigerant enters into the second valve seat chamber from the first valve seat chamber through the valve port of the valve port portion. Since a diameter of the second valve seat chamber is greater than a diameter of the second pipe connecting portion, and is greater than a diameter of the valve port, the refrigerant will reduce a flow rate and pressure after passing through the valve port, thereby reducing the noise when the refrigerant passes through the electronic expansion valve.

BRIEF DESCRIPTION OF THE DRAWINGS

In order to more clearly illustrate embodiments of the present application, the drawings to be used in the embodiments or in the description of the conventional technology are briefly described below. Apparently, the drawings in the following description only show some embodiments of the present application, and other drawings may be obtained by those skilled in the art from the drawings without any creative work.

Figure 1:
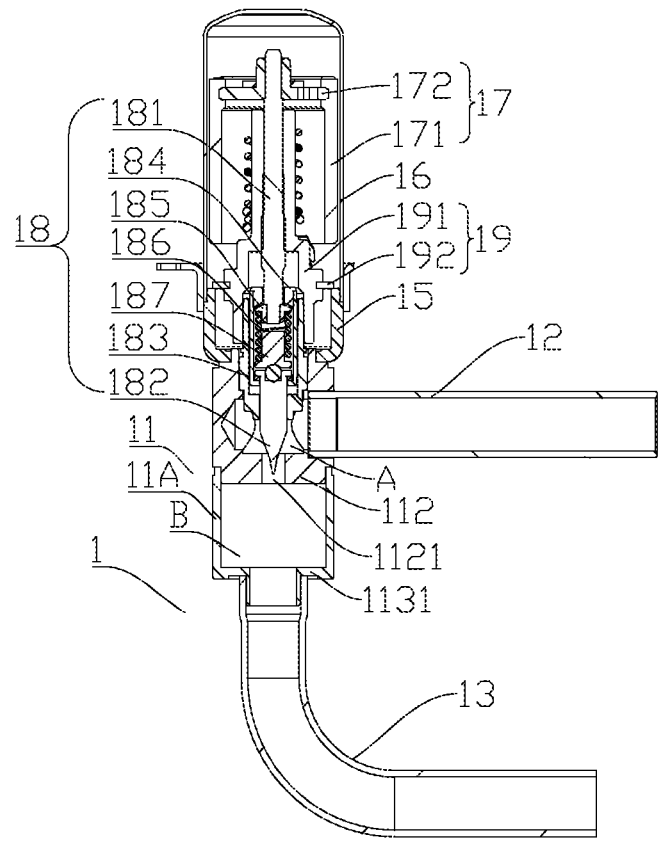
FIG. 1 is a schematic sectional view of an electronic expansion valve according to a first embodiment of the present application.

Reference numerals:

| | | | |
|---|---|---|---|
| 1 | electronic expansion valve, | 11 | valve seat assembly, |
| 11A | outer wall portion, | 110 | main valve seat, |
| 111 | circumferential wall portion, | 1111 | first circumferential wall portion, |
| 11111 | first port portion, | 1112 | second circumferential wall portion, |

-continued

| Reference numerals: | | | |
|---|---|---|---|
| 1113 | main circumferential wall portion, | 11131 | first port portion, |
| 11132 | second port portion, | 11141 | first port portion, |
| 112 | valve port portion, | 1121 | valve port, |
| 113 | end cover, | 1131 | bottom wall portion, |
| 11311 | second port portion, | 1132 | bottom wall portion, |
| 1133 | bottom wall portion, | 11331 | second port portion, |
| 12 | first pipe connecting portion, | 13 | second pipe connecting portion, |
| 15 | valve body portion, | 16 | housing, |
| 17 | magnetic rotor assembly, | 171 | magnetic rotor, |
| 172 | connecting plate, | 18 | screw rod valve needle assembly, |
| 181 | screw rod, | 182 | valve needle, |
| 183 | sleeve portion, | 184 | end plate portion, |
| 185 | boss, | 186 | spring, |
| 187 | support member, | 19 | nut assembly, |
| 191 | nut, | 192 | connecting piece. |

DETAILED DESCRIPTION OF THE EMBODIMENTS

In order to make those skilled in the art better understand the technical solutions of the present application, the technical solution will be described completely hereinafter in conjunction with the drawings and embodiments of the present application.

Referring to FIG. 1, FIG. 1 is a schematic structural view of an electronic expansion valve according to a first embodiment of the present application.

It should be noted that, the present application illustrates a specific structure of the electronic expansion valve, and aims to improve the structure of a valve seat assembly of the electronic expansion valve. Other members of the electronic expansion valve, such as a magnetic rotor assembly, a screw rod valve needle assembly, a nut assembly, a stop device and others, are not limited and described in detail here. The present application does not special limit the structure of the above member, those skilled in the art may apply the technical solution disclosed according to the present application to all similar structure of the electronic expansion valve.

The electronic expansion valve 1 is provided with a valve seat assembly 11, and the valve seat assembly 11 is fixedly connected with a first pipe connecting portion 12 and a second pipe connecting portion 13. The structure of the valve seat assembly 11 will be described in detail below. A valve body portion 15 is arranged on a relatively upper side of the valve seat assembly 11. The valve body portion is substantially cup-shaped with an open bottom, an opening is provided on the bottom thereof, and which is fixedly connected to the valve seat assembly 11. Specifically, a step may be arranged on an upper end of the valve seat assembly 11, and the opening at the bottom of the valve body portion 15 is matched with the step, and the opening and the step are fixedly by welding, or fixedly by welding in other forms. The present application does not limit a specific matching structure of the connection between the valve seat portion 15 and the valve seat assembly 11.

A housing 16 is further arranged above the valve body portion 15. The housing 16 may be fixed to the valve body portion 15 by welding. Thus, a space is formed in the housing 16, the valve body portion 15 and the valve seat assembly 11.

It should be noted that, for the electronic expansion valve, the valve body portion 15 does not have to exist, when the valve body portion 15 does not exist, the housing 16 may be directly fixedly connected to the valve seat assembly 11.

A magnetic rotor assembly 17, a screw rod valve needle assembly 18 and a nut assembly 19 are arranged in the space formed by the housing 16, the valve body portion 15 and the valve seat assembly 11. The magnetic rotor assembly 17 is rotatable due to the electromagnetic force of an electromagnetic coil. The magnetic rotor assembly 17 includes a magnetic rotor 171 and a connecting plate 172 fixedly connected or integrally arranged with the magnetic rotor 171. The screw rod valve needle assembly 18 includes a screw rod 181 which is fixedly connected to the connecting plate 172. Thus, the screw rod 181 is connected to the magnetic rotor assembly 17 as a whole through the connecting plate 172. Specifically, the screw rod 181 may be fixedly connected to the connecting plate 172 by welding.

The screw rod valve needle assembly further includes a valve needle 182, a sleeve portion 183, an end plate portion 184, a boss 185, a spring 186 and a support member 187. The screw rod 181 is in floating connection with the valve needle 182 through the sleeve portion 183. The sleeve portion 183 is substantially cup-shaped with an open bottom, and an opening is provided on the bottom thereof. The valve needle 182 passes through the opening and enters into a first valve seat chamber A (described in detail below) to be matched with the valve port 1121 for adjusting. That is, during operation of the electronic expansion valve, the valve needle 182 may move up and down within a certain stroke relative to the sleeve portion 183, but cannot separate from the restriction of the sleeve portion 183. The end plate portion 184 is provided on the top of the sleeve portion 183, and the end plate portion 184 is provided with an end plate thrust surface. A lower end portion of the screw rod 181 is fixedly connected with the boss 185, and the boss 185 is provided with a boss thrust surface. The spring 186 is further provided on the back of the boss thrust surface, and is supported by the support member 187. During assembly, the boss 185 and the screw rod 181 may be fixedly connected with each other first and then put into the internal space of the sleeve portion 183, and then the end plate portion 184 is fixed to the sleeve portion 183 by welding. Thus, the boss thrust surface is opposite to the end plate thrust surface, and the sleeve portion 183 is suspended on the screw rod 181. The sleeve portion 183 cannot be separated from the screw rod 181, but can make a relative movement. The separation described in the present application refers to that the sleeve portion 183 and the screw rod 181 are separated from each other to two separate members without any restriction therebetween, rather than the absence of physical contact between the sleeve portion 183 and the screw rod 181 only.

The nut assembly 19 includes a nut 191 and a connecting piece 192. The nut 191 and the connecting piece 192 are fixedly connected to each other or integrally formed, and the nut 191 is fixed in the space formed by the housing 16 and the valve body portion 15 through the connecting piece 192 made of metal. Specifically, the nut 191 may be made of non-metal material and are integrally injection molded with the connecting piece 192, and the connecting piece 192 is fixedly connected to the valve body portion 15 by welding.

The nut 191 is provided with a through hole in the axial direction thereof, and an internal thread is provided inside the through hole. Correspondingly, a section of external thread is provided on an outer peripheral surface of the screw rod 181. Thus, when the magnetic rotor assembly 17 rotates, the screw rod 181 linked with the magnetic rotor assembly 17 makes an upward and downward movement relative to the nut assembly 19 while rotating under the action of thread pair, thereby driving the valve needle 182 to do the lifting movement.

It should be noted that, the description about the structure of each member above the valve seat assembly 11 is only a specific structure to make those skilled in the art more easily understand the basic working principle of the electronic expansion valve, and does not intend to limit the protection scope of the present application. The technical solution of the present application may also be applied to the electronic expansion valve with other movement structures.

Figure 2:
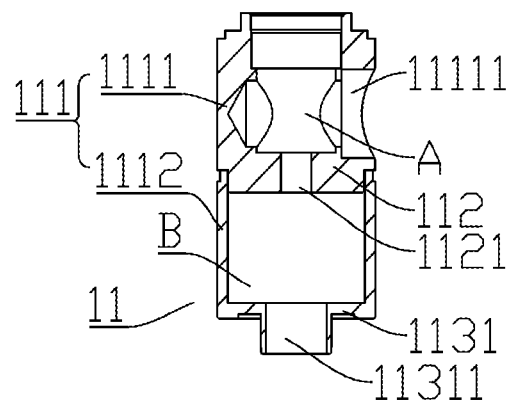
FIG. 2 is a schematic sectional view of a valve seat assembly in FIG. 1.

Referring to FIGS. 1 and 2, FIG. 1 is a schematic sectional view of an electronic expansion valve according to a first embodiment of the present application; and FIG. 2 is a schematic sectional view of the valve seat assembly in FIG. 1.

In the first embodiment, an outer wall portion 11A of the valve seat assembly 11 includes a circumferential wall portion 111 which includes a first circumferential wall portion 1111. The valve port portion 112 and the first circumferential wall portion 1111 may be formed by processing integral material, which are integrally formed. The valve port portion 112 and the first circumferential wall portion 1111 may also be processed respectively and then be fixed by welding or interference fit. For ease of description, a member that the valve port portion 112 and the first circumferential wall portion 1111 are integrally formed or fixedly connected to each other is collectively referred to as a first valve seat portion which is substantially cup-shaped. The valve port portion 112 is provided with a valve port 1121. When the valve needle 182 does the upward and downward movement, the valve needle 182 will be away from or close to the valve port portion 112, so that a flow area between the valve port 1121 and the valve needle 182 changes, thereby controlling the flow of the refrigerant passing through the valve port 1121. The circumferential wall portion 111 includes a second circumferential wall portion 1112, and the outer wall portion 11A includes a bottom wall portion 1131. The second circumferential wall portion 1112 and the bottom wall portion 1131 may be integrally formed. The second circumferential wall portion 112 and the bottom wall portion 1131 may also be processed respectively and then be fixed by welding or interference fit. For ease of description, a member that the bottom wall portion 1131 and the second circumferential wall portion 1112 are integrally formed or fixedly connected to each other is collectively referred to as a second valve seat portion which is substantially cup-shaped. The second circumferential wall portion 1112 and the bottom wall portion 1131 are integrally formed, the second circumferential wall portion and the bottom wall portion have no strict distinction in the present embodiment, the bottom wall portion 1131 refers to a bottom region, and the second circumferential wall portion 1112 refers to a peripheral region.

In this specification, the first circumferential wall portion 1111 includes a part of the outer wall portion 11A corresponding to the first valve seat chamber A and a part of the outer wall portion 11A integrated with the part of the outer wall portion 11A corresponding to the first valve seat chamber A and corresponding to the valve port portion 112. The second circumferential wall portion 1112 includes a part of the outer wall portion 11A corresponding to the second valve seat chamber B, and a part of the remaining outer wall portion 11A integrated with the part of the outer wall portion 11A corresponding to the second valve seat chamber B. The first circumferential wall portion 1111 and the second circumferential wall portion 1112 are only used for convenience of description, which may be understood by those skilled in the art conveniently and do not intend to limit the protection scope.

The first valve seat portion may be fixedly connected to the second valve seat portion by welding. Specifically, a stepped portion may by arranged on the bottom of the first valve seat portion, and the second circumferential wall portion 1112 of the second valve seat portion is matched with the stepped portion and then the two are fixed by welding. The way for fixing the first valve seat portion and the second valve seat portion by welding is not limited in the present embodiment.

Thus, the electronic expansion valve includes two chambers, which are respectively the first valve seat chamber A and the second valve seat chamber B. The first valve seat chamber A is located above the valve port portion 112, or at least the most part of the first valve seat chamber A is located above the valve port portion 112. The second valve seat chamber B is located below the valve port portion 112, or at least the most part of the second valve seat chamber B is located below the valve port portion 112. When the valve needle 182 does not close the valve port 1121, the second valve seat chamber B may be in communication with the first valve seat chamber A through the valve port 1121.

The first circumferential wall portion 1111 is provided with a first port portion 11111 for being matched and fixedly connected with the first pipe connecting portion 12. Generally, the first pipe connecting portion 12 is fixedly connected with the valve seat assembly 11 at a position of the first port portion 11111 by welding. The bottom wall portion 1131 is provided with a second port portion 11311 for being matched and fixedly connected with the second pipe connecting portion 13, and the second pipe connecting portion 13 may also be fixedly connected with the valve seat assembly 11 by welding. At this time, the first pipe connecting portion 12 is mostly located above the valve port portion 112 or the first pipe connecting portion 12 is entirely located above the valve port portion 112. The first port portion 11111 is mostly located above the valve port portion 112 or the first port portion 11111 is entirely located above the valve port portion 112, and the second pipe connecting portion 13 and the second port portion 11311 are located below the valve port portion 112. When the refrigerant flows toward the direction of the second pipe connecting portion through the first pipe connecting portion, the second valve seat chamber B is greater than the valve port. Specifically, a portion of the second valve seat chamber B close to the valve port portion is greater than the valve port or an average diameter of the second valve seat chamber B is greater than a diameter of the valve port. Thus, when the refrigerant enters into the second valve seat chamber B from the first valve seat chamber A through the valve port 1121, a flow path of the refrigerant is in a state of rapid amplification, which can effectively reduce a flow rate and pressure of fluid, thereby reducing the noise when the refrigerant passes through. The outer wall portion 11A of the valve seat assembly 11 of the present embodiment includes the outer wall portion 11A of the first valve seat portion and an end cover. The outer wall portion 11A of the valve seat assembly 11 of the present embodiment includes the outer wall portion HA of the first valve seat portion and the second valve seat portion.

Figure 3:
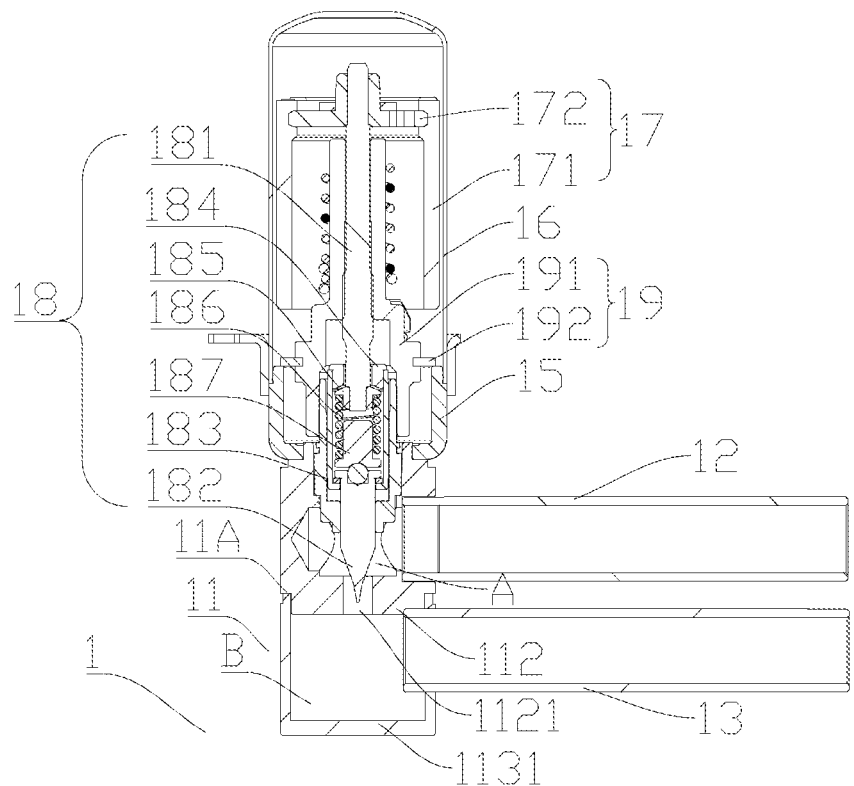
FIG. 3 is a schematic sectional view of another electronic expansion valve according to the first embodiment of the present application.
Figure 4:
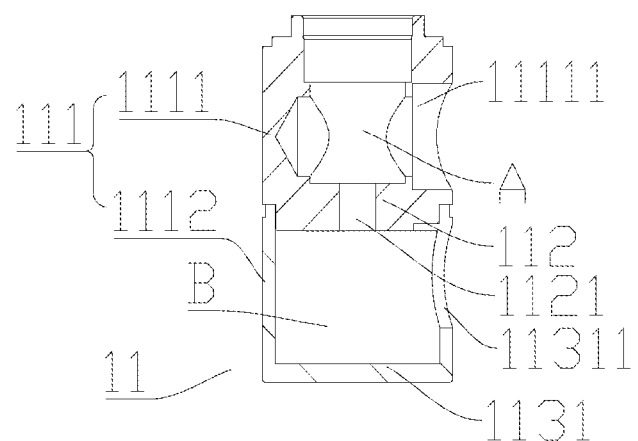
FIG. 4 is a schematic sectional view of the valve seat assembly in FIG. 3.

The valve seat assembly 11 may be other structural forms. The second port portion 11311 is not only arranged on the bottom wall portion 1131, but also may be arranged on the circumferential wall portion 111. As shown in FIGS. 3 and 4, FIG. 3 is a schematic sectional view of another electronic expansion valve according to the first embodiment; and FIG. 4 is a schematic sectional view of the valve seat assembly in FIG. 3. Specifically, the valve seat assembly 111 includes the first valve seat portion and the second valve seat portion. The first valve seat portion is fixedly connected with the second valve seat portion by welding, and the first pipe connecting portion 12 and the second pipe connecting portion 13 are fixedly connected with the valve seat assembly 11 by welding. The first valve seat portion includes the first circumferential wall portion 1111 and the valve port portion 112, and the second valve seat portion includes the second circumferential wall portion 1112 and the bottom wall portion 1131. The first circumferential wall portion 1111 and the valve port portion 112 are integrally formed, and the second circumferential wall portion 1112 and the bottom wall portion 1131 are integrally formed. Most part of the second port portion 11311 of the present embodiment is located on the second circumferential wall portion 1112, and small part of the second port portion is located on the first circumferential wall portion 1111, or in other word, the second port portion 11311 is arranged on the circumferential wall portion 111 of the valve seat assembly 11. At this time, the second pipe connecting portion 13 is led out from a side surface of the valve seat assembly 11. At this time, at least most part of the first pipe connecting portion 12 is located below the valve port portion 112, and at least most part of the second pipe connecting portion 13 is located below the valve port portion 112. An inner chamber of the first pipe connecting portion 12 is in direct communication with the first valve seat chamber A, and an inner chamber of the second pipe connecting portion 13 is in direct communication with the second valve seat chamber B. When the valve port is opened, the inner chamber of the first pipe connecting portion 12 is in communication with the inner chamber of the second pipe connecting portion 13 through the first valve seat chamber A, the valve port 1121 and the second valve seat chamber B.

An inner diameter of the second valve seat chamber B is greater than an inner diameter of the second pipe connecting portion, and an inner diameter of the valve port 1121 is less than an inner diameter of the second valve seat chamber B. Since the shape of the valve port 1121 may have multiple structural forms, that is, for the whole valve port 1121, multiple different inner diameters may exist. In this specification, the inner diameter of the valve port 1121 is an inner diameter at the minimum position of the valve port 1121. When the second valve seat chamber B is a regularly cylindrical chamber, the inner diameter of the second valve seat chamber B is the inner diameter of the second valve seat chamber B. The shape of the second valve seat chamber B may be irregular, which may be an inverted truncated cone shape, a stepped shape or a combination of multiple configurations. When the interior of the second valve seat chamber B is non-standard cylindrical, the second valve seat chamber B is described by the diameter. When the second pipe connecting portion 13 is fixedly connected to the valve seat assembly 11 after enlarging or reducing, the inner diameter of the second pipe connecting portion 13 is the inner diameter of the second pipe connecting portion 13 before enlarging or reducing, or when a cross section of the second pipe connecting portion 13 is non-standard circular, the inner diameter of the second pipe connecting portion 13 is referred to as the diameter of the second pipe connecting portion 13.

According to the above arrangement, the first pipe connecting portion 12 is fixedly connected to the outer wall portion 11A, and a connection portion between the first pipe connecting portion 12 and the outer wall portion 11A is relatively close to the first valve seat chamber A. The second pipe connecting portion 13 is fixedly connected to the outer wall portion 11A, and a connection portion between the second pipe connecting portion 13 and the outer wall portion 11A is relatively close to the second valve seat chamber B. The diameter of the second valve seat chamber B relatively close to the valve port portion 112 is greater than the diameter of the second pipe connecting portion 13, and the diameter of the valve port 1121 may be less than the diameter of the second valve seat chamber B. The average diameter of the second valve seat chamber B may also be arranged to be greater than the diameter of the second pipe connecting portion 13. The diameter of the valve port 1121 is less than the diameter of the second valve seat chamber B, and the diameter of the valve port 1121 is less than the diameter of the second pipe connecting portion 13.

The electronic expansion valve includes the first valve seat chamber A and the second valve seat chamber B. When the refrigerant flows in a flow direction, the refrigerant enters into the second valve seat chamber B through the valve port 1121 of the valve port portion 112 from the first valve seat chamber A, since the second valve seat chamber B is greater than the second pipe connecting portion 13, and greater than the diameter of the valve port 1121, the flow rate and pressure of the refrigerant will be reduced after the refrigerant pass through the valve port 1121, thus reducing the noise when the refrigerant passes through electronic expansion valve. The outer wall portion 11A of the valve seat assembly 11 according to the present embodiment includes the outer wall portion 11A of the first valve seat portion and the second valve seat portion.

Figure 5:
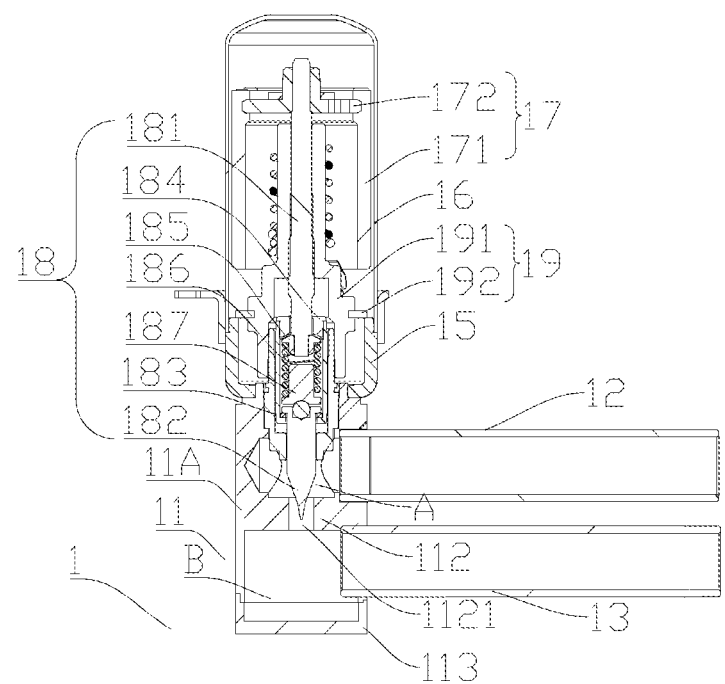
FIG. 5 is a schematic sectional view of an electronic expansion valve according to a second embodiment of the present application.
Figure 6:
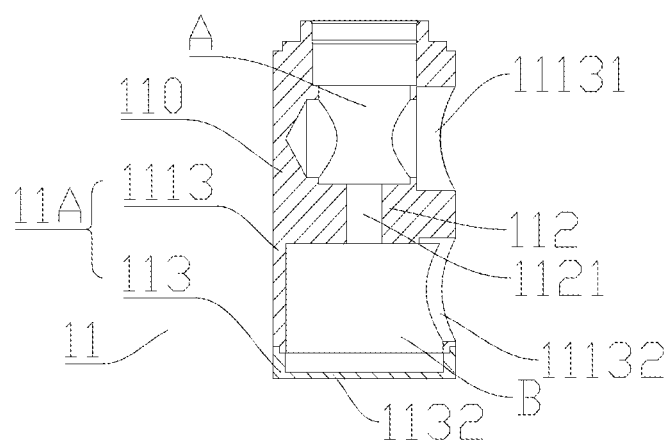
FIG. 6 is a schematic sectional view of the valve seat assembly in FIG. 5.

Referring to FIG. 5 to FIG. 6, FIG. 5 is a schematic sectional view of an electronic expansion valve according to a second embodiment of the present application; and FIG. 6 is a schematic sectional view of the valve seat assembly in FIG. 5. The valve seat assembly 11 includes a main valve seat 110 and an end cover 113, and the main valve seat 110 and the end cover 113 are respectively processed and fixedly connected by welding to form the valve seat assembly 11. The main valve seat 110 includes a main circumferential wall portion 1113 and the valve port portion 112, and the main circumferential wall portion 1113 and the valve port portion 112 are integrally formed. The end cover 113 includes the bottom wall portion 1132 and a vice circumferential wall portion, and the bottom wall portion 1132 and the vice circumferential wall portion are integrally formed. The outer wall portion 11A of the valve seat assembly 11 according to the present embodiment includes the main circumferential wall portion 1113 and the end cover 113. The circumferential wall portion 111 according to the present embodiment includes the circumferential wall portion 111 of the main valve seat 110, that is, the main circumferential wall portion 1113 and the circumferential wall portion 111 of the end cover 113. The main circumferential wall portion 1113 and the valve port portion 112 are integrally formed by processing the same material. The main circumferential wall portion 1113 and the valve port portion 112 may also be processed respectively and then fixedly connected by welding or interference fit. The valve port portion 112 is provided with the valve port 1121. At the lower end of the main wall portion 1113, the main valve seat 110 is fixedly connected to the end cover with the end cover 113, the form for fixedly connecting the main valve seat 110 with the end cover 113 may adopt a method for welding the main circumferential wall portion 1113 with a vice circumferential wall portion of the end cover 113, or a step may be provided at the bottom of the main wall portion 1113. The step is matched with the outer edge of the end cover 113. Then, the step and the edge of the end cover 113 are fixedly connected by welding. The present embodiment does not specific limit the form for fixedly connecting the main valve seat 110 with the end cover 113.

Similarly, the electronic expansion valve includes two chambers, which are first valve seat chamber A and the second valve seat chamber B, respectively. The first valve seat chamber A is located above the valve port portion 112 or at least mostly located above the valve port portion 112, and the second valve seat chamber B is located below the valve port portion 112 or at least mostly located below the valve port portion 112. When a valve needle 182 does not close the valve port 1121, the second valve seat chamber B is in communication with the first valve seat chamber A through the valve port 1121.

The valve seat assembly 11 is provided with a first port portion 11131 on an relatively upper side of the main valve seat 110, the first port portion 11131 is at least mostly located above the valve port portion 112, or in other words, the first port portion 11131 is arranged on an relatively upper side of the main circumferential wall portion 1113. The valve seat assembly 11 is fixedly connected to the first pipe connecting portion 12 at the first port portion 11131 by welding. The valve seat assembly 11 is provided with a second port portion 11132 at a relatively lower side of the main valve seat 110, and the second port portion 11132 is at least mostly located below the valve port portion 112. The valve seat assembly 11 and the second pipe connecting portion 13 are fixedly connected to the second port portion 11132 at the second port portion 11132 by welding. At this time, the second pipe connecting portion 13 is led out from a side of the valve seat assembly 11. At this time, the first pipe connecting portion 12 is located above the valve port portion 112 or at least mostly located above the valve port portion 112, and the second pipe connecting portion 13 is located below the valve port portion 112 or at least mostly located below the valve port portion 112. The outer wall portion 11A of the valve seat assembly 11 according to the present embodiment is not formed by a single part, which includes a part of the main valve seat 110 and an end cover 113. The first circumferential wall portion 1111 is arranged on a relatively upper side of the main valve seat 110, the second circumferential wall portion 1112 is mostly arranged on the main valve seat 110, that is, arranged on a relatively lower side of the main valve seat 110, and the part of the second circumferential wall portion 1112 is further located on the end cover 113.

Figure 7:
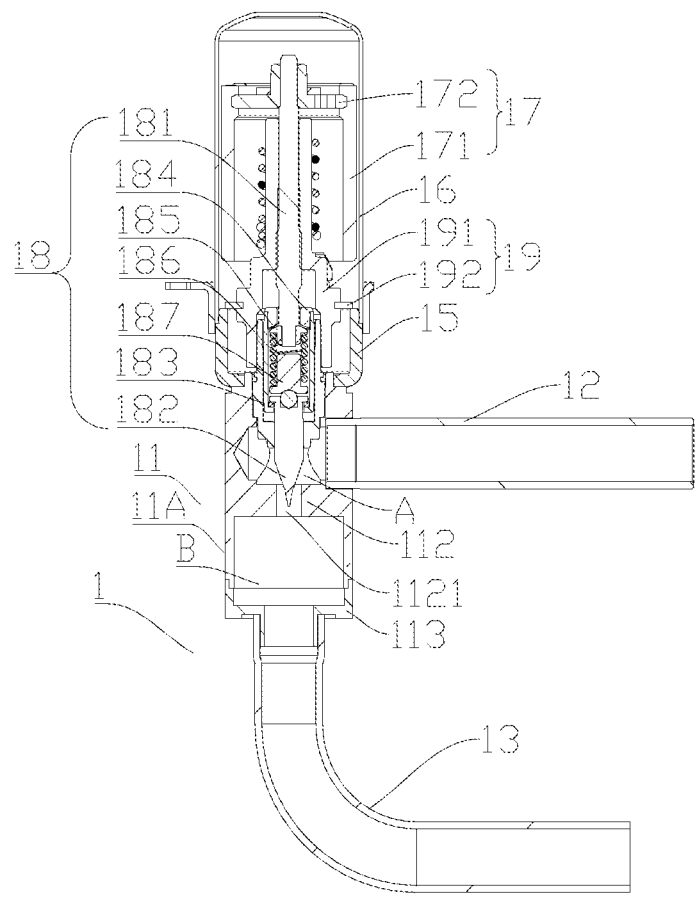
FIG. 7 is a schematic sectional view of another electronic expansion valve according to the second embodiment of the present application.
Figure 8:
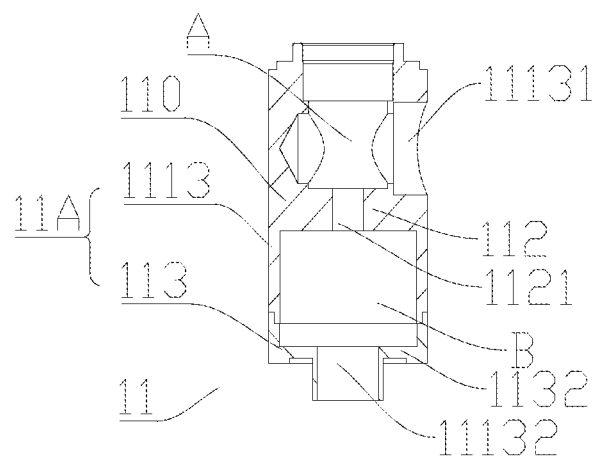
FIG. 8 is a schematic sectional view of the valve seat assembly in FIG. 7.

The structure of the valve seat assembly 11 further may be the structure as shown FIGS. 7 and 8. FIG. 7 is a schematic sectional view of another electronic expansion valve according to a second embodiment of the present application; and FIG. 8 is a schematic sectional view of the valve seat assembly in FIG. 7. The valve seat assembly 11 includes the main valve seat 110 and the end cover 113, and the main valve seat 110 also includes the main circumferential wall portion 1113 and the valve port portion 112. The end cover 113 includes the bottom wall portion 1132 and the vice circumferential wall portion (not shown in the figures). The second port portion 11132 may be arranged not only on the circumferential wall portion 111 of the outer wall portion 11A of the valve seat assembly 11 located below the valve port portion 112, but also may be arranged on the bottom wall portion 1132. When the second port portion 11132 is arranged on the bottom wall portion 1132, in order to make the cooperation between the second port portion 11132 and the second valve seat portion more firmly, an extended portion extending downward along a peripheral direction of the second port portion 11132 may be arranged at the bottom wall portion 1132. The extended portion is matched with the second pipe connecting portion 13. Specifically, the second pipe connecting portion 2 is sleeved on the periphery of the extended portion, or the extended portion is sleeved on the periphery of the second pipe connecting portion 13. In addition, as described above, when an outer edge of the bottom wall portion 1132 extends upward to a certain degree, the second port portion 11132 even may be arranged on an outer edge surface of the bottom wall portion 1132. At this time, the first pipe connecting portion 12 is substantially located above the valve port portion 112, and the second pipe connecting portion 13 is basically located below the valve port portion 112.

The second valve seat chamber B is greater than the second pipe connecting portion 13, that is, the inner diameter of the second valve seat chamber B is greater than the inner diameter of the second pipe connecting portion 13, or in other words, a diameter of the second valve seat chamber B is greater than the diameter of the second pipe connecting portion 13, and the inner diameter of the valve port 1121 is less than the inner diameter of the second valve seat chamber B or the diameter at the minimum position of the valve port 1121 is less than the diameter of the second valve seat chamber B. Specifically, the diameter of the second valve seat chamber close to the valve port portion 112 is greater than the diameter of the second pipe connecting portion 13 or the average diameter of the second valve seat chamber B is greater than the diameter of the second pipe connecting portion 13. The diameter of the second valve seat chamber B is greater than the diameter at the minimum position of the valve port 1121. The shape of the valve port 1121 may have multiple different inner diameters or diameters. The diameter of the valve port 1121 is the diameter at the minimum position of the valve port 1121. When the second valve seat chamber B is basically a regularly cylindrical chamber, the inner diameter of the second valve seat chamber B is the inner diameter of the second valve seat chamber B. When the second valve seat chamber B is irregular, the second valve seat chamber B may be inverted plate-shaped, stepped or a combination of multiple structures. When the second pipe connecting portion 13 is fixedly connected to the valve seat assembly 11 after enlarging or reducing, the inner diameter of the second pipe connecting portion 13 refers to the inner diameter of the second pipe connecting portion 13 before enlarging or reducing, or when the section of the second pipe connecting portion 13 is non-standard circular, the inner diameter of the second pipe connecting portion 13 is referred to as the diameter of the second pipe connecting portion 13.

The electronic expansion valve includes the first valve seat chamber A and the second valve seat chamber B. When the refrigerant flows in a flow direction, the refrigerant enters into the second valve seat chamber B through the valve port of the valve port portion from the first valve seat chamber A, since the second valve seat chamber B is greater than the second pipe connecting portion 13, and greater than the valve port 1121, the flow rate and pressure of the refrigerant will be reduced after the refrigerant passes through the valve port 1121, thus reducing the noise when the refrigerant passes through the electronic expansion valve.

The outer wall portion 11A and the bottom wall portion 1132 of the valve seat assembly 11 are relative to the valve seat assembly 11, and are not formed from a single component.

Figure 9:
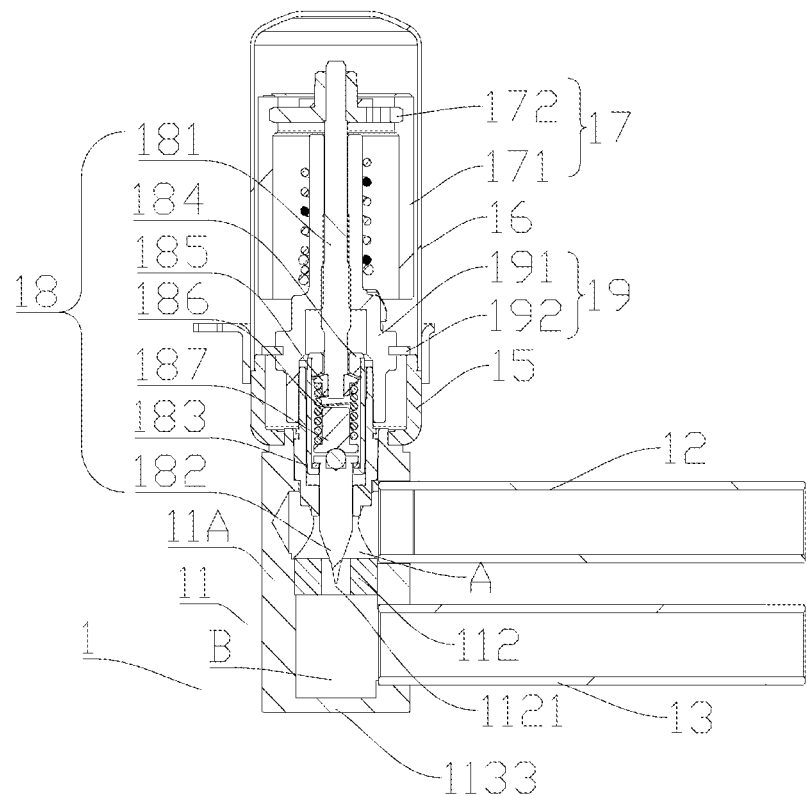
FIG. 9 is a schematic sectional view of an electronic expansion valve according to a third embodiment of the present application.
Figure 10:
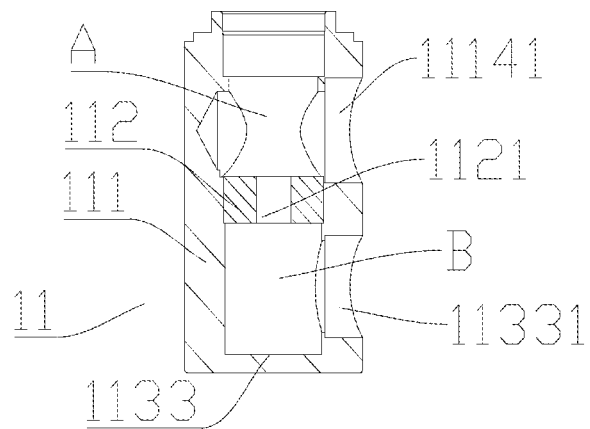
FIG. 10 is a schematic sectional view of the valve seat assembly in FIG. 9.

The valve seat assembly 11 may further be other structures, as shown in FIGS. 9 and 10. FIG. 9 is a schematic sectional view of an electronic expansion valve according to a third embodiment of the present application; and FIG. 10 is a schematic sectional view of the valve seat assembly in FIG. 9. The valve seat assembly 11 includes the outer wall portion 11A and the valve port portion 112. The outer wall portion of the valve seat assembly 11 includes the circumferential wall portion 111 and the bottom wall portion 1133. The circumferential wall portion 111 and the bottom wall portion 1133 are integrally formed according to the present embodiment. The circumferential wall portion 111 is substantially cylindrical. The valve port portion 112 is provided with the valve port 1121, the valve port portion 112 and the outer wall portion 11A are processed respectively and then fixedly connected by welding or interference fit.

Through the above arrangement, the electronic expansion valve is divided into two chambers through the valve port portion 112, which are the first valve seat chamber A and the second valve seat chamber B, respectively. The first valve seat chamber A is relatively located above the valve port portion 112, and the second valve seat chamber B is located below the valve port portion 112. When the valve needle 182 does not close the valve port 1121, the valve port 1121 is in communication with the first valve seat chamber A and the second valve seat chamber B.

The first port portion 11141 is provided on the relatively upper circumferential wall portion 111 of the outer wall portion 11A of the valve seat assembly 11. The first pipe connecting portion 12 is fixedly connected to the valve seat assembly 11 at the first port portion 11141 by welding. The second port portion 11331 is provided on the relatively lower circumferential wall portion 111 of the outer wall portion 11A of the valve seat assembly 11. The second pipe connecting portion 13 is fixedly connected to the valve seat assembly 11 at the second port portion 11331 by welding. At this time, the first pipe connecting portion 12 at least mostly located above the valve port portion 112, and the second pipe connecting portion 13 is entirely or at least mostly located below the valve port portion 112.

Figure 11:
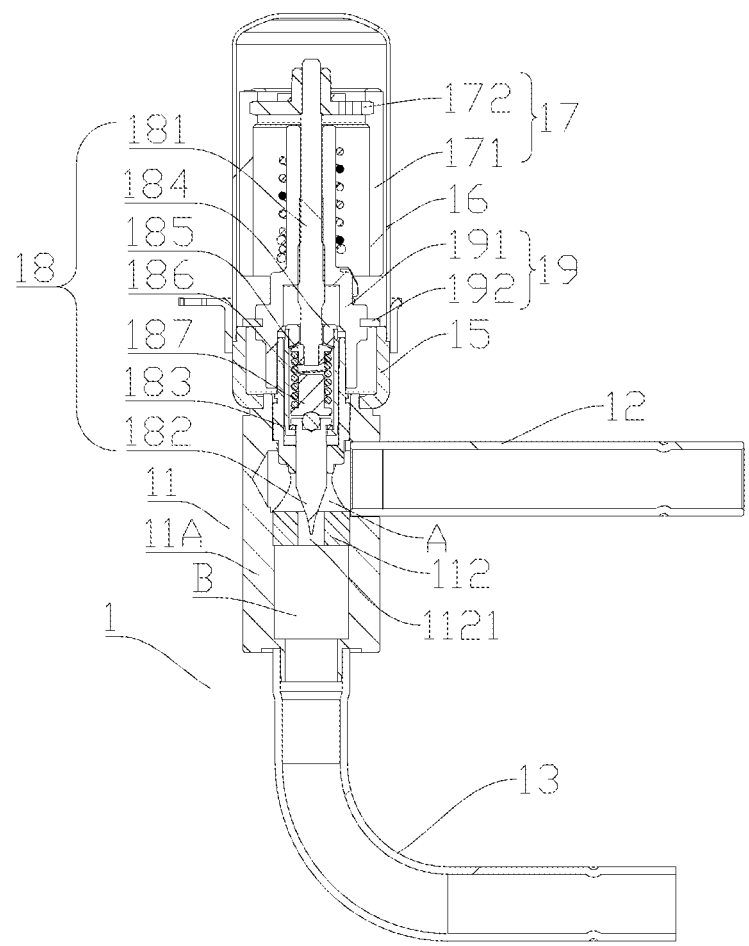
FIG. 11 is a schematic sectional view of another electronic expansion valve according to the third embodiment of the present application.
Figure 12:
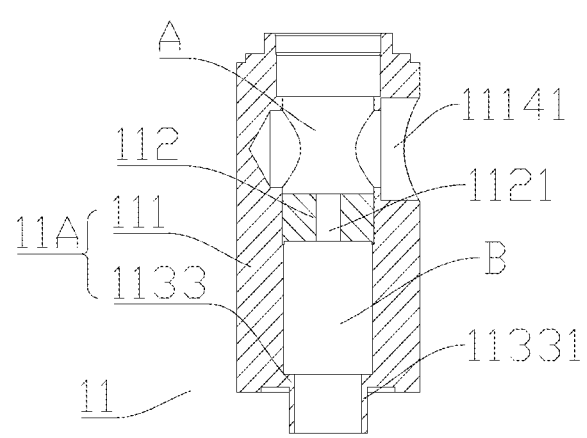
FIG. 12 is a schematic sectional view of the valve seat assembly in FIG. 11.

The valve seat assembly 11 according to the present embodiment may also be correspondingly changed, as shown in FIGS. 11 and 12. FIG. 11 is a schematic sectional view of another electronic expansion valve according to the third embodiment of the present application; and FIG. 12 is a schematic sectional view of the valve seat assembly in FIG. 11. The second port portion 11331 not only may be arranged on the part of the circumferential wall portion 111 located below the valve port portion 112, but also may be arranged on the bottom wall portion 1133. When the second port portion 11331 is arranged on the bottom wall portion 1133, in order to make the cooperation between the second port portion 11331 and the valve seat assembly 11 more firmly, the extended portion extending downward along the periphery of the second port portion 11331 may be arranged on the bottom wall portion 1133, the extended portion is matched with the second pipe connecting portion 13. Specifically, the second pipe connecting portion 13 is sleeved on the periphery of the extended portion, or the extended portion is sleeved on the periphery of the second pipe connecting portion 13. At this time, the first pipe connecting portion 12 is at least mostly located above the valve port portion 112, and the second pipe connecting portion 13 is at least mostly located below the valve port portion 112.

The second valve seat chamber B is greater than the second pipe connecting portion 13, that is, the inner diameter of the second valve seat chamber B is greater than the inner diameter of the second pipe connecting portion 13, or in other words, the diameter of the second valve seat chamber B is greater than the diameter of the second pipe connecting portion 13, and the inner diameter of the valve port 1121 is less than the inner diameter of the second valve seat chamber B or the diameter at the minimum position of the valve port 1121 is less than the diameter of the second valve seat chamber B. Specifically, the diameter of the second valve seat chamber close to the valve port portion 112 is greater than the diameter of the second pipe connecting portion 13 or the average diameter of the second valve seat chamber B is greater than the diameter of the second pipe connecting portion 13. The diameter of the second valve seat chamber B is greater than the diameter at the minimum position of the valve port 1121. The shape of the valve port 1121 may have multiple different inner diameters or diameters. The diameter of the valve port 1121 is the diameter at the minimum position of the valve port 1121. When the second valve seat chamber B is basically a regularly cylindrical chamber, the inner diameter of the second valve seat chamber B is the inner diameter of the second valve seat chamber B. When the second valve seat chamber B is irregular, the second valve seat chamber B may be inverted plate-shaped, stepped or a combination of multiple structures. When the second pipe connecting portion 13 is fixedly connected to the valve seat assembly 11 after enlarging or reducing, the inner diameter of the second pipe connecting portion 13 refers to the inner diameter of the second pipe connecting portion 13 before enlarging or reducing, or when the section of the second pipe connecting portion 13 is non-standard circular, the inner diameter of the second pipe connecting portion 13 is referred to as the diameter of the second pipe connecting portion 13. The electronic expansion valve includes the first valve seat chamber A and the second valve seat chamber B. When the refrigerant flows in a flow direction, the refrigerant enters into the second valve seat chamber B through the valve port of the valve port portion from the first valve seat chamber A, since the second valve seat chamber B is greater than the second pipe connecting portion 13, and greater than the valve port 1121, the flow rate and pressure of the refrigerant will be reduced after the refrigerant passed through the valve port 1121, thus reducing the noise when the refrigerant passes through the electronic expansion valve.

The "circumferential wall portion" recorded in the description and claims of the present application refers to the integral peripheral wall portion of the valve seat assembly, which can be an integral structure or formed by fixedly connecting the two or more components, while the "first circumferential wall portion" and "second peripheral wall portion" are the concepts introduced to facilitate the description of the valve seat assembly formed by assembling separately. Each of the first circumferential wall portion and the second circumferential wall portion is a portion for forming the circumferential wall portion. In addition to the first circumferential wall portion and the second circumferential wall portion, the circumferential wall portion may also include other components or other portions, for example, in the second embodiment, the end cover also includes a part of the circumferential wall portion. The typical structures of the first circumferential wall portion and the second circumferential wall portion are recorded in the above-mentioned related embodiments. Certainly, on the basis of the above-mentioned embodiments, the shape of the first and second circumferential wall portions may be simply changed to obtain new embodiments.

In the description and claims of the present application, "valve port portion" refers to a region where the valve port is provided or a relatively middle region relatively close to the valve port. "Bottom wall portion" means a bottom region of the valve seat assembly opposite to the valve port. In this application, the names of "valve port portion" and "bottom wall portion" do not mean that "valve port portion" and "bottom wall portion" must be independent components. For example, in the second embodiment, the bottom wall portion is formed by a part of the end cover.

It should be noted that the orientation terms such as up, down, left, right mentioned in the embodiment are all introduced for the convenience of description based on the drawings in the description; and the ordinal terms such as "first" and "second" in the component name are also introduced for the convenience of description, and do not mean to make any restriction on any order of the components. In addition, since the functions of some portions of the components provided by the embodiment are the same, the specification adopts a unified naming method for these portions.

The electronic expansion valve and the valve seat assembly provided by the relevant technical solutions are introduced in detail, which uses specific examples to illustrate in this application. The above description of the embodiments is only used to help understand the method and core idea of the present application. It should be noted that, for those skilled in the art that the technical solution of the present application may be further combined, variously improve and modified without departing from the principle of the present application, and these combinations, improvements and modifications also fall within the protection scope defined by the claims of the present application.

The invention claimed is:

1. An electronic expansion valve, comprising:
a valve seat assembly;
a first pipe connecting portion; and
a second pipe connecting portion, wherein,
the valve seat assembly comprises an outer wall portion and a valve port portion provided with a valve port,
the electronic expansion valve comprises a first valve seat chamber and a second valve seat chamber, the first valve seat chamber is located above the valve port portion, and the second valve seat chamber is located below the valve port portion, the valve port is configured to communicate the first valve seat chamber with the second valve seat chamber, the first pipe connecting portion is fixedly connected to the outer wall portion located above the valve port portion, the second pipe connecting portion is fixedly connected to the outer wall portion located below the valve port portion, an inner diameter of the second valve seat chamber is greater than an inner diameter of the second pipe connecting portion, and the inner diameter of the valve port is less than an inner diameter of the second valve seat chamber, wherein the electronic expansion valve further comprises:
a magnetic rotor assembly, a screw rod valve needle assembly and a nut assembly,
wherein the screw rod valve needle assembly includes a screw rod, a valve needle, a sleeve portion, a spring and a support member, the screw rod is in floating connection with the valve needle through the sleeve portion, the sleeve portion is in cup shape with an open bottom on the bottom thereof, the valve needle passes through the opening and enters into the first valve seat chamber to be matched with the valve port for adjusting, the spring is provided in the sleeve portion, one end of the spring is supported to the sleeve portion, and the other end of the spring is supported to the support member coupled with the valve needle, so as the valve needle is able to move up and down within a certain stroke relative to the sleeve portion;
wherein the nut assembly is provided with a through hole in the axial direction thereof, the screw rod passes through the through hole and is threaded connected with the nut assembly, so that when the magnetic rotor assembly rotates, the screw rod linked with the magnetic rotor assembly makes an upward and downward movement relative to the nut assembly while rotating, thereby driving the valve needle to do the lifting movement.

2. The electronic expansion valve according to 1, wherein, the outer wall portion comprises a circumferential wall portion, and
the circumferential wall portion comprises a first circumferential wall portion, the first circumferential wall portion and the valve port portion are integrally formed or the first circumferential wall portion is fixedly connected with the valve port portion, the valve seat assembly is provided with a first port portion on the first circumferential wall portion, the first pipe connecting portion is fixedly connected to the valve seat assembly at the first port portion; and
the circumferential wall portion comprises a second circumferential wall portion, the outer wall portion comprises a bottom wall portion, the valve seat assembly is provided with a second port portion on the second circumferential wall portion or the bottom wall portion, and the second pipe connecting portion is fixedly connected to the valve seat assembly at the second port portion.

3. The electronic expansion valve according to claim 2, wherein, the valve seat assembly comprises a first valve seat portion and a second valve seat portion, the first valve seat portion is fixedly connected to the second valve seat portion by welding; and
the first valve seat portion comprises the first circumferential wall portion and the valve port portion, the second valve seat portion comprises the second circumferential wall portion and the bottom wall portion, the first port portion is located on the first circumferential wall portion, the second port portion is located on the bottom wall portion, the first pipe connecting portion is fixedly connected to the first valve seat portion by welding, and the second pipe connecting portion is fixedly connected to the second valve seat portion by welding, at least most part of the second port portion is located below the second valve seat chamber, and the second port portion is opposite to the valve port portion.

4. The electronic expansion valve according to claim 1, wherein, the valve seat assembly comprises a main valve seat and an end cover, the main valve seat is fixedly connected to the end cover by welding, the main valve seat comprises a main circumferential wall portion, the outer wall portion comprises the main circumferential wall portion and the end cover, the end cover comprises a bottom wall portion, the valve port portion and the main circumferential wall portion are integrally formed or the valve port portion is fixedly connected to the main circumferential wall portion, the first port portion is located on the main circumferential wall portion, at least most part of the first port portion is located above the valve port portion, the second port portion is located on the bottom wall portion, and the second port portion is located below the valve port portion.

5. The electronic expansion valve according to claim 1, wherein, the valve seat assembly comprises the outer wall portion and the valve port portion, the outer wall portion is an integrated structure, and the outer wall portion is in interference fit with the valve port portion or the outer wall portion is fixed to the valve port portion by welding, the outer wall portion comprises a circumferential wall portion and a bottom wall portion, the first port portion is located on the circumferential wall portion, at least most part of the first port portion is located above the valve port portion, the second port portion is located on the bottom wall portion, and the second port portion is located below the valve port portion; and an inner chamber of the first pipe connecting portion is in direct communication with the first valve seat chamber, and an inner chamber of the second pipe connecting portion is in direct communication with the second valve seat chamber.

6. The electronic expansion valve according to claim 3, wherein, the valve port portion is located a middle region of the valve seat assembly in the axial direction, the bottom wall portion is opposite to the valve port portion, the second port portion is opposite to the valve port portion, a diameter of the valve port portion is less than the diameter of the second port portion, and the diameter of the second valve seat chamber is greater than the diameter of the second port portion.

7. The electronic expansion valve according to claim 2, wherein, the valve seat assembly comprises a main valve seat and an end cover, the main valve seat is fixedly connected to the end cover by welding, the main valve seat comprises a main circumferential wall portion, the outer wall portion comprises the main circumferential wall portion and the end cover, the end cover comprises a bottom wall portion, the valve port portion and the main circumferential wall portion are integrally formed or the valve port portion is fixedly connected to the main circumferential wall portion, the first port portion is located on the main circumferential wall portion, at least most part of the first port portion is located above the valve port portion, the second port portion is located on the bottom wall portion, and the second port portion is located below the valve port portion.

8. The electronic expansion valve according to claim 4, wherein, the valve port portion is located a middle region of the valve seat assembly in the axial direction, the bottom wall portion is opposite to the valve port portion, the second port portion is opposite to the valve port portion, a diameter of the valve port portion is less than the diameter of the second port portion, and the diameter of the second valve seat chamber is greater than the diameter of the second port portion.

9. The electronic expansion valve according to claim 5, wherein, the valve port portion is located a middle region of the valve seat assembly in the axial direction, the bottom wall portion is opposite to the valve port portion, the second port portion is opposite to the valve port portion, a diameter of the valve port portion is less than the diameter of the second port portion, and the diameter of the second valve seat chamber is greater than the diameter of the second port portion.

10. An electronic expansion valve, comprising:
a valve seat assembly;
a first pipe connecting portion; and
a second pipe connecting portion, wherein,
the valve seat assembly comprises an outer wall portion and a valve port portion provided with a valve port,
the electronic expansion valve comprises a first valve seat chamber and a second valve seat chamber, at least most part of the first valve seat chamber is located above the valve port portion, and at least most part of the second valve seat chamber is below the valve port portion, the valve port is configured to communicate the first valve seat chamber with the second valve seat chamber, the first pipe connecting portion is fixedly connected to the outer wall portion, and a connection portion between the first pipe connecting portion and the outer wall portion is relatively close to the first valve seat chamber, the second pipe connecting portion is fixedly connected to the outer wall portion, and a connection portion between the second pipe connecting portion and the outer wall portion is relatively close to the second valve seat chamber, a diameter of the second valve seat chamber relatively close to the valve port portion is greater than a diameter of the second pipe connecting portion, and the diameter of the valve port is less than a diameter of the second valve seat chamber,
wherein the electronic expansion valve further comprises: a magnetic rotor assembly, a screw rod valve needle assembly and a nut assembly,
wherein the screw rod valve needle assembly includes a screw rod, a valve needle, a sleeve portion, a spring and a support member, the screw rod is in floating connection with the valve needle through the sleeve portion, the sleeve portion is in cup shape with an open bottom on the bottom thereof, the valve needle passes through the opening and enters into the first valve seat chamber to be matched with the valve port for adjusting, the spring is provided in the sleeve portion, one end of the spring is supported to the sleeve portion, and the other end of the spring is supported to the support member coupled with the valve needle, so as the valve needle is able to move up and down within a certain stroke relative to the sleeve portion;
wherein the nut assembly is provided with a through hole in the axial direction thereof, the screw rod passes through the through hole and is threaded connected with the nut assembly, so that when the magnetic rotor assembly rotates, the screw rod linked with the magnetic rotor assembly makes an upward and downward movement relative to the nut assembly while rotating, thereby driving the valve needle to do the lifting movement.

11. The electronic expansion valve according to claim 10, wherein, the outer wall portion comprises a circumferential wall portion, and the circumferential wall portion comprises a first circumferential wall portion, the first circumferential wall portion and the valve port portion are integrally formed or the first circumferential wall portion is fixedly connected with the valve port portion, the valve seat assembly is provided with a first port portion on the first circumferential wall portion, the first pipe connecting portion is fixedly connected to the valve seat assembly at the first port portion; and the circumferential wall portion comprises a second circumferential wall portion, the outer wall portion comprises a bottom wall portion, the valve seat assembly is provided with a second port portion on the second circumferential wall portion or the bottom wall portion, and the second pipe connecting portion is fixedly connected to the valve seat assembly at the second port portion.

12. The electronic expansion valve according to claim 11, wherein, the valve seat assembly comprises a first valve seat portion and a second valve seat portion, the first valve seat portion is fixedly connected to the second valve seat portion by welding; and the first valve seat portion comprises the first circumferential wall portion and the valve port portion, the second valve seat portion comprises the second circumferential wall portion and the bottom wall portion, the first port portion is located on the first circumferential wall portion, the second port portion is located on the bottom wall portion, the first pipe connecting portion is fixedly connected to the first valve seat portion by welding, and the second pipe connecting portion is fixedly connected to the second valve seat portion by welding, at least most part of the second port portion is located below the second valve seat chamber, and the second port portion is opposite to the valve port portion.

13. The electronic expansion valve according to claim 10, wherein, the valve seat assembly comprises a main valve seat and an end cover, the main valve seat is fixedly connected to the end cover by welding, the main valve seat comprises a main circumferential wall portion, the outer wall portion comprises the main circumferential wall portion and the end cover, the end cover comprises a bottom wall portion, the valve port portion and the main circumferential wall portion are integrally formed or the valve port portion is fixedly connected to the main circumferential wall portion, the first port portion is located on the main circumferential wall portion, at least most part of the first port portion is located above the valve port portion, the second port portion is located on the bottom wall portion, and the second port portion is located below the valve port portion.

14. The electronic expansion valve according to claim 10, wherein, the valve seat assembly comprises the outer wall portion and the valve port portion, the outer wall portion is an integrated structure, and the outer wall portion is in interference fit with the valve port portion or the outer wall portion is fixed to the valve port portion by welding, the outer wall portion comprises a circumferential wall portion and a bottom wall portion, the first port portion is located on the circumferential wall portion, at least most part of the first port portion is located above the valve port portion, the second port portion is located on the bottom wall portion, and the second port portion is located below the valve port portion; and an inner chamber of the first pipe connecting portion is in direct communication with the first valve seat chamber, and an inner chamber of the second pipe connecting portion is in direct communication with the second valve seat chamber.

15. An electronic expansion valve, comprising:
a valve seat assembly;
a first pipe connecting portion; and
a second pipe connecting portion, wherein,
the valve seat assembly comprises an outer wall portion and a valve port portion provided with a valve port,
the electronic expansion valve comprises a first valve seat chamber and a second valve seat chamber, at least most part of the first valve seat chamber is located above the valve port portion, and at least most part of the second valve seat chamber is located below the valve port portion, the valve port is configured to communicate the first valve seat chamber with the second valve seat chamber, the first pipe connecting portion is fixedly connected to the outer wall portion, a connection portion between the first pipe connecting portion and the outer wall portion is relatively close to the first valve seat chamber, the second pipe connecting portion is fixedly connected to the outer wall portion, and a connection portion between the second pipe connecting portion and the outer wall portion is relatively close to the second valve seat chamber, an average diameter of the second valve seat chamber is greater than a diameter of the second pipe connecting portion, and a diameter of the valve port is less than a diameter of the second valve seat chamber, and the diameter of the valve port is less than a diameter of the second pipe connecting portion, wherein the electronic expansion valve further comprises: a magnetic rotor assembly, a screw rod valve needle assembly and a nut assembly, wherein the screw rod valve needle assembly includes a screw rod, a valve needle, a sleeve portion, a spring and a support member, the screw rod is in floating connection with the valve needle through the sleeve portion, the sleeve portion is in cup shape with an open bottom on the bottom thereof, the valve needle passes through the opening and enters into the first valve seat chamber to be matched with the valve port for adjusting, the spring is provided in the sleeve portion, one end of the spring is supported to the sleeve portion, and the other end of the spring is supported to the support member coupled with the valve needle, so as the valve needle is able to move up and down within a certain stroke relative to the sleeve portion;

wherein the nut assembly is provided with a through hole in the axial direction thereof, the screw rod passes through the through hole and is threaded connected with the nut assembly, so that when the magnetic rotor assembly rotates, the screw rod linked with the magnetic rotor assembly makes an upward and downward movement relative to the nut assembly while rotating, thereby driving the valve needle to do the lifting movement.

16. The electronic expansion valve according to claim 15, wherein, the outer wall portion comprises a circumferential wall portion, and the circumferential wall portion comprises a first circumferential wall portion, the first circumferential wall portion and the valve port portion are integrally formed or the first circumferential wall portion is fixedly connected with the valve port portion, the valve seat assembly is provided with a first port portion on the first circumferential wall portion, the first pipe connecting portion is fixedly connected to the valve seat assembly at the first port portion; and the circumferential wall portion comprises a second circumferential wall portion, the outer wall portion comprises a bottom wall portion, the valve seat assembly is provided with a second port portion on the second circumferential wall portion or the bottom wall portion, and the second pipe connecting portion is fixedly connected to the valve seat assembly at the second port portion.

17. The electronic expansion valve according to claim 16, wherein, the valve seat assembly comprises a first valve seat portion and a second valve seat portion, the first valve seat portion is fixedly connected to the second valve seat portion by welding; and the first valve seat portion comprises the first circumferential wall portion and the valve port portion, the second valve seat portion comprises the second circumferential wall portion and the bottom wall portion, the first port portion is located on the first circumferential wall portion, the second port portion is located on the bottom wall portion, the first pipe connecting portion is fixedly connected to the first valve seat portion by welding, and the second pipe connecting portion is fixedly connected to the second valve seat portion by welding, at least most part of the second port portion is located below the second valve seat chamber, and the second port portion is opposite to the valve port portion.

18. The electronic expansion valve according to claim 15, wherein, the valve seat assembly comprises a main valve seat and an end cover, the main valve seat is fixedly connected to the end cover by welding, the main valve seat comprises a main circumferential wall portion, the outer wall portion comprises the main circumferential wall portion and the end cover, the end cover comprises a bottom wall portion, the valve port portion and the main circumferential wall portion are integrally formed or the valve port portion is fixedly connected to the main circumferential wall portion, the first port portion is located on the main circumferential wall portion, at least most part of the first port portion is located above the valve port portion, the second port portion is located on the bottom wall portion, and the second port portion is located below the valve port portion.

19. The electronic expansion valve according to claim 15, wherein, the valve seat assembly comprises the outer wall portion and the valve port portion, the outer wall portion is an integrated structure, and the outer wall portion is in interference fit with the valve port portion or the outer wall portion is fixed to the valve port portion by welding, the outer wall portion comprises a circumferential wall portion and a bottom wall portion, the first port portion is located on the circumferential wall portion, at least most part of the first port portion is located above the valve port portion, the second port portion is located on the bottom wall portion, and the second port portion is located below the valve port portion; and an inner chamber of the first pipe connecting portion is in direct communication with the first valve seat chamber, and an inner chamber of the second pipe connecting portion is in direct communication with the second valve seat chamber.

* * * * *